United States Patent Office 2,895,096
Patented July 14, 1959

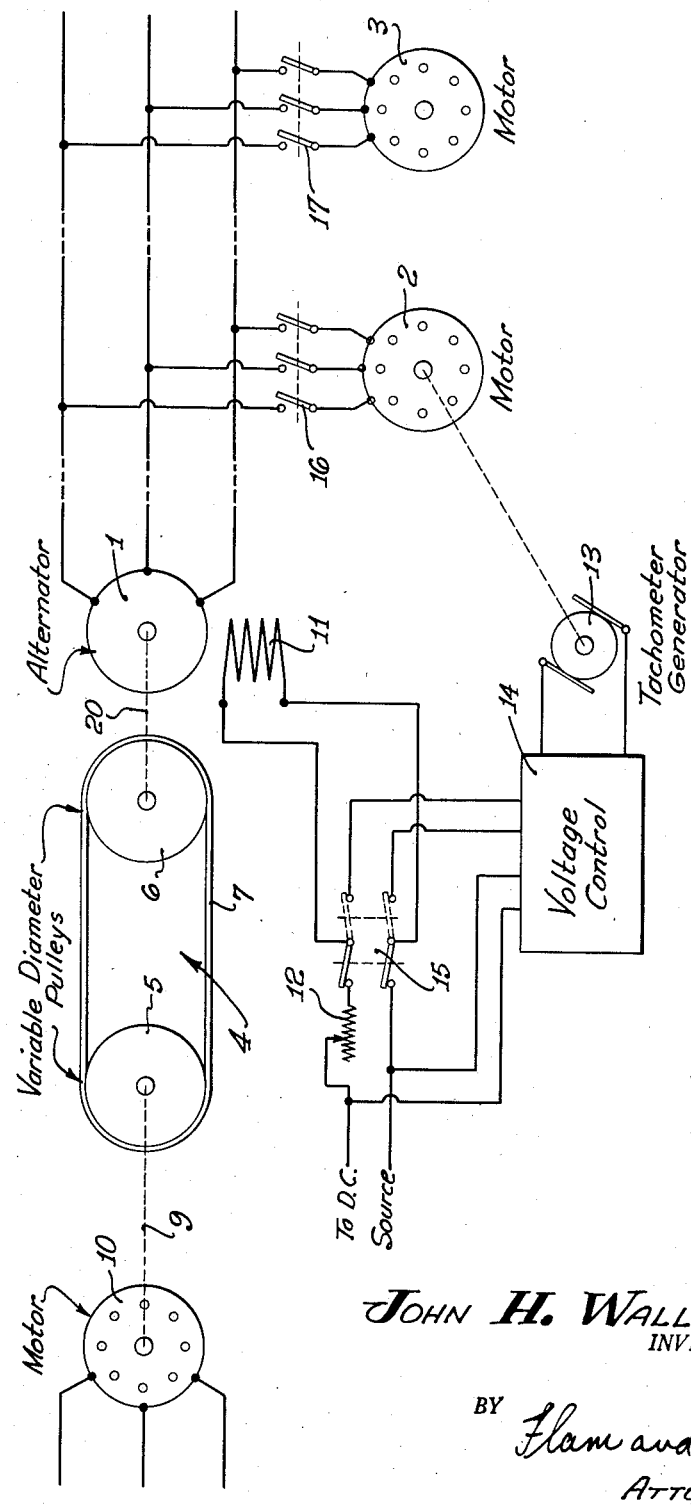

2,895,096
SYSTEM FOR CONTROLLING INDUCTION MOTOR SPEEDS

John H. Wallace, Milford, Conn., assignor to U.S. Electrical Motors, Inc., Los Angeles, Calif., a corporation of California Application May 21, 1956, Serial No. 586,212

2 Claims. (Cl. 318—146)

This invention relates to the control of the speeds of induction motors operating upon alternating mains.

It is often desirable to provide one or more drive motors that are arranged to provide output speeds over a very wide range; for example, of a few revolutions per minute up to about synchronous speed.

Since the speed of such motors is a function of the frequency of the alternating current source, it would appear to be practicable to utilize an alternator of adjustable speed to cause a corresponding variation in frequency of the alternator output. Such adjustment in speed is effected most simply by a transmission device using variable diameter pulleys; however, it is impractical with a single set of pulleys to obtain a continuous speed variation corresponding, for example, from one hundred cycles down to a few cycles.

It is one of the objects of this invention to make it possible, in a simple manner, to supplement the speed range of the induction motors without extending the range of adjustment of the transmission mechanism.

In order to accomplish this result, and to make it possible to start the induction motors at a very low speed, use is made of the "slip" of the motors. As is well-known, induction motors under ordinary loads, come up nearly, but not quite to synchronous speed; and the difference between the speed and synchronous speed is usually defined as a ratio, in percentages, of this difference as compared to synchronous speed. By adjusting the slip, the starting speeds can be correspondingly adjusted, below that provided by the variable ratio transmission mechanism.

It is accordingly another object of this invention to provide a system of this character in which the slip of an induction motor is varied or adjusted within wide limits to extend the lower speed limit of the system.

For this purpose, the excitation of the alternator is reduced; this in turn causes a reduction in the electromotive force applied to the motor, and a consequent substantial increase in the slip.

It is still another object of this invention to adjust the excitation of the alternator in an automatic manner for maintaining the speed of the motor within narrow limits upon load variations.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings, the single figure is a diagram of a system incorporating the invention.

In this system, an alternator 1 is indicated as supplying multi-phase electrical energy to one or more induction motors 2 and 3. These induction motors are arranged in parallel and are provided with circuit controllers 16 and 17 for connecting them to the alternator 1. The induction motors may be coupled to loads that require close synchronization and at speeds adjustable over a wide range as, for example, one or two revolutions per minute up to several thousand revolutions per minute.

In order to cover a portion of the speed adjustment, the alternator 1 is adapted to be driven by aid of a continuously variable transmission mechanism 4. This variable transmission mechanism may include, for example, variable diameter pulleys 5 and 6 connected by a belt 7. The output pulley 6 may be directly connected to the alternator 1 as by the aid of a shaft 20. The driving pulley 5 is shown as directly coupled as by a shaft 9 to an induction motor 10. The pulley structures 5 and 6 may be of the multiple type, if necessary to make the transmission mechanism capable of transmitting the load.

By varying the ratio of the transmission mechanism 4, the frequency of the alternating current generated by the alternator 1 may be correspondingly varied. The speed of the induction motors 2 and 3 will approach synchronism, corresponding to a slip of about two or three percent.

The lowest available speed of the alternator 1 may often be insufficient to provide a low enough speed for the motors 2 and 3. For example, a frequency variation of the alternator between 20 and 100 is readily obtainable, but frequencies below that value would require more complicated transmission mechanisms capable of being continuously adjusted through the entire range.

In order to overcome this difficulty and make it possible to use the motors 2 and 3 at lower speeds, such as for "inching" motors or to start these motors, the excitation of the alternator 1 is made adjustable. An exciter winding 11 for the alternator 1 is indicated, which is fed with direct current through a variable resistance 12. By increasing resistance 12, the excitation is reduced. Accordingly, the electromotive force fed to the motors 2 and 3 is correspondingly reduced. It is well-known that the slip of induction motors increases quite rapidly with decrease in voltage applied. This is made use of for further reducing the speed of the motors 2 and 3.

Thus, for starting the motors 2 and 3 from standstill, the resistance 12 is increased; the transmission mechanism 4 is adjusted to minimum speed; and then the motors 2 and 3 are connected to the alternator 1. This operation brings the motors to a low starting speed. The resistance 12 is now gradually reduced, causing a gradual increase in speed of the motors. After the speed has been brought up by decreasing the resistance 12 so as to fall within the range of operation of the transmission mechanism 4, the transmission mechanism may be adjustable to bring the motors 2 and 3 up to full speed. The reverse operation of reducing the speed from full speed may be readily effected.

It may be advantageous automatically to adjust the excitation in the exciter winding 11. This may be effected as by the aid of a tachometer generator 13 directly coupled to one of the motors 2 or 3. The output of this tachometer generator may be used to influence the direct current source by the aid of a voltage control device 14. When the speed is reduced below a definite value, the voltage control is operated to increase the current through exciting winding 11 and to bring back the speed to the value desired. Similarly, an increase in the speed beyond the desired value, will cause the voltage control 14 to reduce the current flow through the exciter winding 11. A closed-loop servo-system is thus formed, and speed may be maintained at a value determined by the position or adjustment of the control 14.

By the aid of a two-pole double-throw switch 15, the control may be changed from manual to automatic. In the full-line position shown, the resistance 12 may be manually adjusted for obtaining excitation control. In the dotted-line position of the switch 15, the automatic control is effected.

The inventor claims:

1. In a system including an alternator having an exciter and a field winding energized by the exciter, an induction motor electrically fed from the alternator, the method of operating said motor over a speed range, which includes: driving the alternator at a minimum speed; reducing the excitation of the alternator for reducing its output electromotive force; connecting the motor to the alternator; increasing through a continuous range to a maximum value, the excitation of the alternator while the alternator is driven at its minimum speed; and then increasing through a continuous range the speed of the alternator while the excitation of the alternator is at its maximum value.

2. A system for extending the range of continuous adjustment in speed of induction motors: a variable ratio transmission mechanism having a continuous range of adjustment between upper and lower limits, the lower limit being substantially above zero; an alternator driven by the transmission mechanism; induction motors electrically powered by the alternator; the alternator having a field winding; and a supplemental closed loop servo system including control means having an adjustable control point and responsive to the speed of one of the motors for varying the excitation of said field winding to maintain motor speed at a value corresponding to the control point; adjustment of the control point from a maximum setting during operation of the variable speed transmission at its minimum setting providing the extended controlled speed range of said induction motors.

References Cited in the file of this patent

UNITED STATES PATENTS

| | | |
|---|---|---|
| 1,115,948 | Lord | Nov. 3, 1914 |
| 1,231,666 | Stuart | July 3, 1917 |
| 1,408,211 | Laycock | Feb. 28, 1922 |
| 1,461,575 | Clough | July 10, 1923 |
| 1,934,505 | Kenah | Nov. 7, 1933 |
| 2,005,894 | Hellmund et al. | June 25, 1935 |
| 2,011,655 | Schaelchin et al. | Aug. 20, 1935 |
| 2,461,258 | Brooks | Feb. 8, 1949 |